United States Patent [19]
Yokota et al.

[11] Patent Number: 5,553,055
[45] Date of Patent: Sep. 3, 1996

[54] DISC PLAYBACK METHOD

[75] Inventors: Teppei Yokota, Chiba; Nobuyuki Kihara, Tokyo; Junichi Aramaki, Chiba, all of Japan

[73] Assignee: Sony Corporation, Tokyo, Japan

[21] Appl. No.: 426,464

[22] Filed: Apr. 19, 1995

Related U.S. Application Data

[63] Continuation of Ser. No. 150,413, Nov. 10, 1993, abandoned.

[30] Foreign Application Priority Data

Nov. 12, 1992 [JP] Japan ................................ 4-327209

[51] Int. Cl.⁶ .......................... G11B 7/00; G11B 11/00; G11B 20/00
[52] U.S. Cl. .................. 369/124; 369/12; 369/32; 369/47; 360/32; 360/40; 360/48
[58] Field of Search .......................... 369/47, 54, 59, 369/32, 124, 116, 13; 360/10.1, 19.1, 32, 40, 48

[56] References Cited

U.S. PATENT DOCUMENTS

| | | | |
|---|---|---|---|
| 4,546,391 | 10/1985 | Kimura | 360/19.1 |
| 4,613,967 | 9/1986 | Hamada | 369/221 |
| 4,775,969 | 10/1988 | Osterlund | 360/48 X |
| 4,789,911 | 12/1988 | Fukushima et al. | 360/72.2 |
| 4,851,933 | 7/1989 | Sugaya et al. | 360/48 X |
| 4,926,405 | 5/1990 | Hangai et al. | 360/78.06 X |
| 5,038,231 | 8/1991 | Harigaya et al. | 360/69 |
| 5,045,956 | 9/1991 | Ejima | 360/51 |
| 5,079,651 | 1/1992 | Tsuchida et al. | 360/72.2 |
| 5,200,864 | 4/1993 | Dunn et al. | 360/48 |
| 5,224,087 | 6/1993 | Maeda et al. | 369/54 |
| 5,243,588 | 9/1993 | Maeda et al. | 369/54 |
| 5,274,513 | 12/1993 | Nakano et al. | 360/72.2 |
| 5,293,276 | 3/1994 | Dunn et al. | 360/50 X |
| 5,305,155 | 4/1994 | Akagiri | 369/32 |

FOREIGN PATENT DOCUMENTS

| | | |
|---|---|---|
| 0051285A2 | 5/1982 | European Pat. Off. . |
| 0472414A1 | 2/1992 | European Pat. Off. . |

*Primary Examiner*—David C. Nelms
*Assistant Examiner*—Son Mai
*Attorney, Agent, or Firm*—Limbach & Limbach L.L.P.

[57] ABSTRACT

A method for fast playback of a disc in a cue or review mode to reproduce therefrom audio data compressed and recorded burstly by a predetermined amount as a unit. The method comprises predetermining a unitary block of data which consists of n times (where n is a positive integer) the decodable minimum unitary amount of the compressed data; sequentially extracting, out of the informationally continuous data of plural programs on the disc, the data of the unitary block at an interval of m unitary blocks (where m is a positive integer) in the forward or reverse direction of the continuity of the data; and reproducing the sound from the extracted data. By repeating such playback operation, the audio data of the plural programs can be reproduced in the cue or review mode at a speed higher than the normal playback speed.

22 Claims, 8 Drawing Sheets

FIG. 3

UTOC SECTOR 0

| | MSB　　　　LSB | MSB　　　　LSB | MSB　　　　LSB | MSB　　　　LSB |
| | d1　　　　　d8 | d1　　　　　d8 | d1　　　　　d8 | d1　　　　　d8 |
|---|---|---|---|---|
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | clusterH | clusterL | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | FirstTNO | Last TNO |
| 8 | 00000000 | 00000000 | 00000000 | Used Sectors |
| 9 | 00000000 | 00000000 | 00000000 | 00000000 |
| 10 | 00000000 | 00000000 | 00000000 | Disc Serial No |
| 11 | DISC | ID | P-DFA | P-EMPTY |
| 12 | P-FRA | P-TN01 | P-TN02 | P-TN03 |
| 13 | P-TN04 | P-TN05 | P-TN06 | P-TN07 |
| 14 | P-TN08 | P-TN09 | P-TN010 | P-TN011 |
| 15 | P-TN012 | P-TN013 | P-TN014 | P-TN015 |
| 16 | P-TN016 | | | |
| 17 | | | | |
| 73 | | | | |
| 74 | P-TN0248 | P-TN0249 | P-TN0250 | P-TN0251 |
| 75 | P-TN0252 | P-TN0253 | P-TN0254 | P-TN0255 |
| 76 | 00000000 | 00000000 | 00000000 | 00000000 |
| 77 | 00000000 | 00000000 | 00000000 | 00000000 |
| 78 | Start address | | | Track mode |
| 79 | End address | | | Link-P |
| 80 | Start address | | | Track mode |
| 81 | End address | | | Link-P |
| 82 | Start address | | | Track mode |
| 83 | End address | | | Link-P |
| 84 | Start address | | | Track mode |
| 85 | End address | | | Link-P |
| 86 | | | | |
| 481 | | | | |
| 482 | | | | |
| 534 | | | | |
| 535 | | | | |
| 586 | Start address | | | Track mode |
| 587 | End address | | | Link-P |

FIG. 4
UTOC SECTOR 1

| | MSB ... LSB<br>d1 ... d8 | MSB ... LSB<br>d1 ... d8 | MSB ... LSB<br>d1 ... d8 | MSB ... LSB<br>d1 ... d8 |
|---|---|---|---|---|
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | clusterH | clusterL | 00000001 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| ... | | | | |
| 73 | | | | |
| 74 | P-TNA248 | P-TNA249 | P-TNA250 | P-TNA251 |
| 75 | P-TNA252 | P-TNA253 | P-TNA254 | P-TNA255 |
| 76 | Disc name or Track name | | | |
| 77 | Disc name or Track name | | | Link-P |
| 78 | Disc name or Track name | | | |
| 79 | Disc name or Track name | | | Link-P |
| 80 | Disc name or Track name | | | |
| 81 | Disc name or Track name | | | Link-P |
| 82 | Disc name or Track name | | | |
| 83 | Disc name or Track name | | | Link-P |
| 84 | Disc name or Track name | | | |
| 85 | Disc name or Track name | | | Link-P |
| 86 | | | | |
| 481 | | | | |
| 482 | | | | |
| 534 | | | | |
| 535 | | | | |
| 586 | Disc name or Track name | | | |
| 587 | Disc name or Track name | | | Link-P |

FIG. 5

UTOC SECTOR 2

|   | MSB　　　　LSB | MSB　　　　LSB | MSB　　　　LSB | MSB　　　　LSB |
|---|---|---|---|---|
|   | d1　　　　　　d8 | d1　　　　　　d8 | d1　　　　　　d8 | d1　　　　　　d8 |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | clusterH | clusterL | 00000010 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 |   |   |   |
| 17 |   |   |   |   |

|   |   |   |   |   |
|---|---|---|---|---|
| 73 |   |   |   |   |
| 74 | P-TRD248 | P-TRD249 | P-TRD250 | P-TRD251 |
| 75 | P-TRD252 | P-TRD253 | P-TRD254 | P-TRD255 |
| 76 | ⌈Disc rec date and time | | | |
| 77 | ⌊ | | 00000000 | 00000000 |
| 78 | ⌈Track rec date and time | | | |
| 79 | ⌊ | | 00000000 | (LINK-P) |
| 80 | ⌈Track rec date and time | | | |
| 81 | ⌊ | | 00000000 | (LINK-P) |
| 82 | ⌈Track rec date and time | | | |
| 83 | ⌊ | | 00000000 | (LINK-P) |
| 84 | ⌈Track rec date and time | | | |
| 85 | ⌊ | | 00000000 | (LINK-P) |
| 86 |   |   |   |   |

|   |   |   |   |
|---|---|---|---|
| 481 |   |   |   |
| 482 |   |   |   |

|   |   |   |   |
|---|---|---|---|
| 534 |   |   |   |
| 535 |   |   |   |

|   |   |   |   |
|---|---|---|---|
| 586 | ⌈Track rec date and time | | |
| 587 | ⌊ | | 00000000 | (LINK-P) |

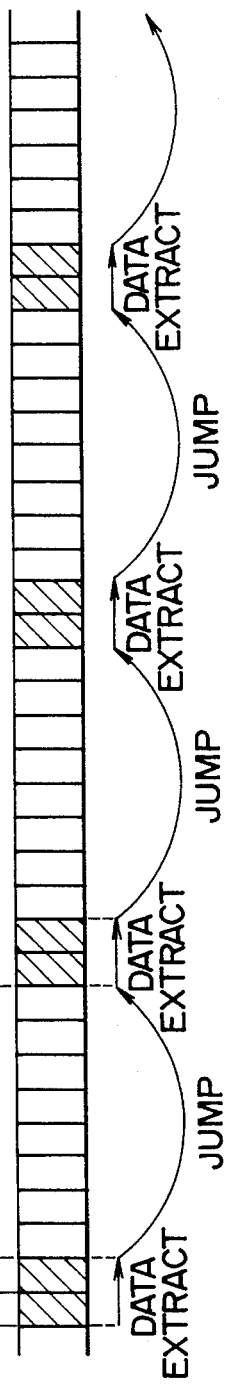
F I G. 6A
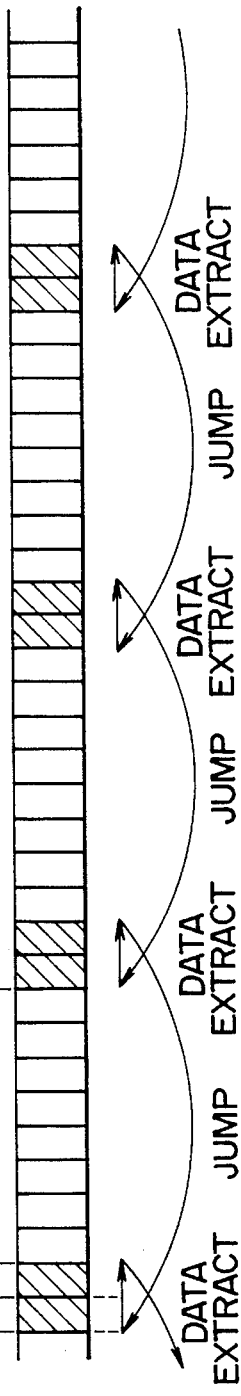
F I G. 6B

DISC PLAYBACK METHOD

This is a continuation of application Ser. No. 08/150,413 filed on Nov. 10, 1993 now abandoned.

BACKGROUND OF THE INVENTION

1. Field of the Invention

The present invention relates to a disc playback method and, more particularly, to a method for fast playback of a disc in cue and review modes.

2. Description of the Related Art

In playback of a compact disc (CD) for example, a fast forward playback operation is performed in a cue mode by moving an optical pickup outward on the disc at a speed higher than a normal playback speed while rotating the disc at a normal velocity, and a fast reverse playback operation is performed in a review mode by moving the optical pickup inward on the disc under such condition.

There is currently proposed an optical disc recording/playback system as disclosed in U.S. Pat. Nos. 5,224,087 and 5,243,588, wherein an audio signal is compressed and recorded in real time on a disc smaller in diameter than a CD, and the recorded signal is reproduced and expanded to be the original audio signal. In this disc recording/playback system also, it may be contrived to perform fast playback of such smaller disc in a cue or review mode as in the known CD player.

However, in the above disc recording/playback system, burst recording and reproduction of compressed audio signal are executed, and it is not exactly ensured that one recorded program is reproduced at continuous positions on the disc. Therefore it is impossible to directly apply the known technique of fast playback in a cue or review mode adopted in the conventional CD player.

SUMMARY OF THE INVENTION

It is an object of the present invention to provide an improved disc playback method which is capable of performing fast playback of a disc in a cue or review mode to reproduce compressed audio signal recorded on the disc.

According to one aspect of the present invention, there is provided a method for fast playback of a disc to reproduce therefrom audio data compressed and recorded burstly by a predetermined amount as a unit. The method comprises predetermining a unitary block which consists of $n$ times (where $n$ is a positive integer) the decodable minimum unitary amount of the compressed data; sequentially extracting, out of the informationally continuous data on the disc, the data of such unitary block at an interval of $m$ unitary blocks (where $m$ is a positive integer) in the forward or reverse direction of the continuity of the data; and reproducing the sound from the extracted audio data to thereby perform fast playback in a cue or review mode.

And according to another aspect of the present invention, there is provided a method for fast playback of a disc where compressed audio data is recorded at random positions by a predetermined amount as a unit, and the disc further has information relative to the recording positions of the data and information relative to the continuity of the recorded data. In this case, a fast playback operation is performed in a cue or review mode on the basis of the information relative to the recording positions on the disc and also the information relative to the continuity of the data.

In the playback method mentioned, the data of the aforesaid unitary block is extracted intermittently out of the informationally continuous data recorded on the disc. Then the extracted data is decoded and expanded to thereby reproduce the sound. In the cue mode for fast forward playback, the data is extracted from the disc intermittently in the forward direction of the temporal continuity of the data. Meanwhile in the review mode, the data is extracted from the disc intermittently in the reverse direction of the temporal continuity of the data.

The above and other features and advantages of the present invention will become apparent from the following description which will be given with reference to the illustrative accompanying drawings.

BRIEF DESCRIPTION OF THE DRAWINGS

FIG. 3 is an explanatory diagram of UTOC information on a disc to which the playback method of the invention is applied;

FIG. 4 is another diagram of the UTOC information on the disc to which the playback method of the invention is applied;

FIG. 5 is a further diagram of the UTOC information on the disc to which the playback method of the invention is applied;

FIGS. 6A and 6B are schematic diagrams for explaining an example of the disc playback method of the invention;

DESCRIPTION OF THE PREFERRED EMBODIMENTS

Hereinafter a preferred embodiment of the present invention will be described with reference to the accompanying drawings which represent an exemplary case where the disc playback method of the invention is applied to the aforementioned disc recording/playback system.

Figure 1:
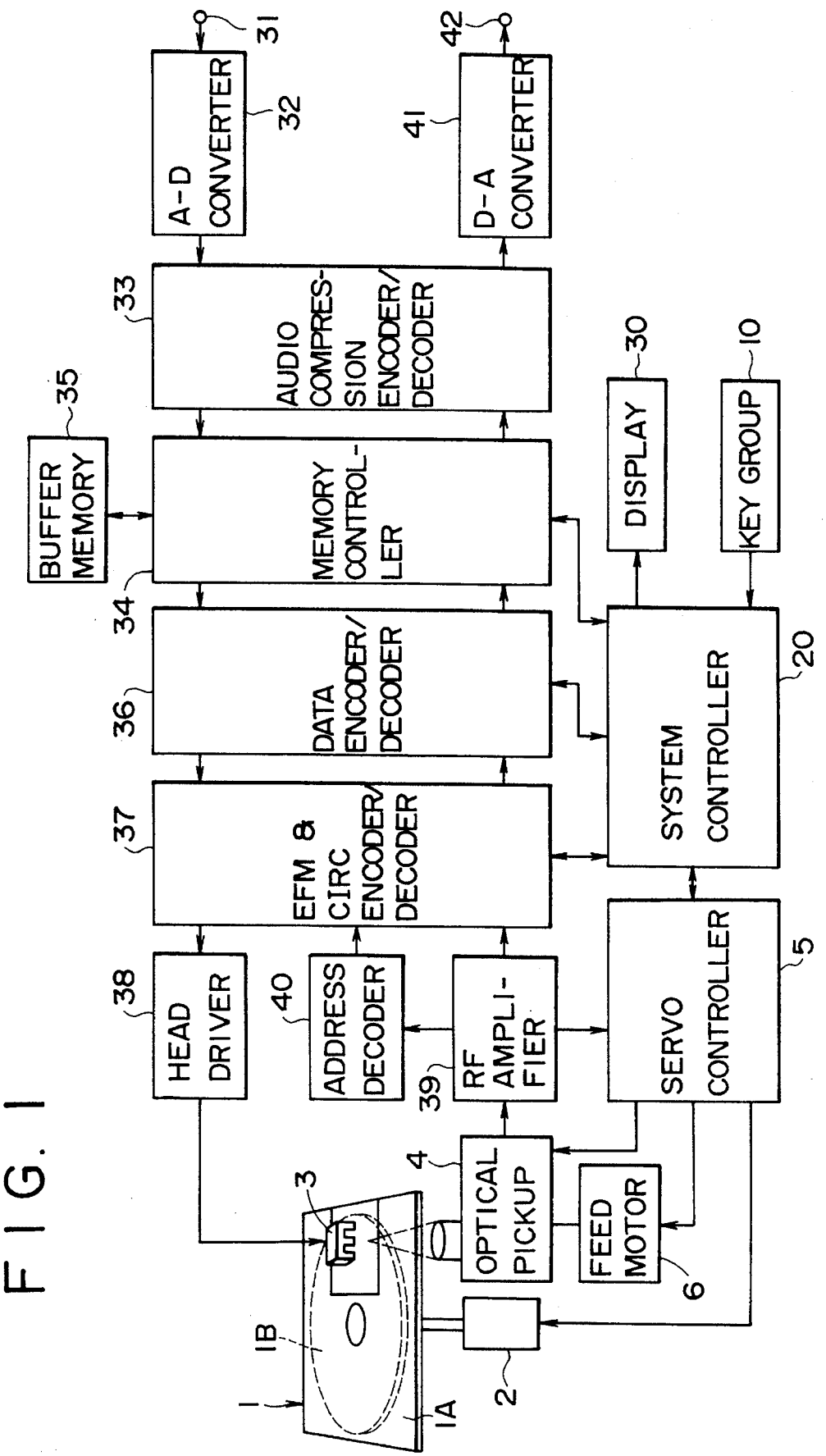
FIG. 1 is a block diagram showing an exemplary constitution of a disc recording/playback apparatus to which the present invention is applied.

FIG. 1 is a block diagram showing the constitution of a disc recording/playback apparatus to which the method of the invention is applied.

Denoted by 1 in this diagram is a recording medium in the shape of a disc. The recording medium 1 consists of a disc-1B which has a diameter of 64 mm and is housed in a cartridge 1A. The disc 1B is classified into three kinds, i.e., a playback-only optical disc, a recordable magneto-optical disc and a hybrid disc having both a playback-only area and a recordable area.

A pregroove is formed previously on the disc 1B for light spot control (tracking control) and, particularly in this embodiment, absolute address data is also recorded thereon previously by wobbling the pregroove.

The disc 1B is rotated by a spindle motor 2. The rotation of the spindle motor 2 is controlled by a servo controller 5 in such a manner as to rotate the disc 1B at a constant linear velocity. A shutter is provided in the cartridge 1A. And the shutter is opened when the cartridge 1A is placed on a disc mounting tray to be thereby loaded in the apparatus. In the use of a recordable optical disc, a recording magnetic head 3 is disposed above the shutter opening at a position opposite to the disc 1B, and an optical pickup 4 is disposed below the shutter opening at a position opposite to the disc 1B.

The motion of the optical pickup 4 is controlled by a feed motor 6 in the radial direction of the disc 1B. And focus and tracking control for the optical pickup 4 are executed by a servo controller 5.

A system controller 20 consists of a microcomputer and serves to control the operation of the entire system. A key input signal is supplied from a key group 10 to the system controller 20. The key group 10 includes a power key, an eject key, a play key, a pause key, a stop key, a record key, a cue key, a review key and so forth.

On a display 30, there are displayed various time information inclusive of total play time of the loaded disc, elapse time and remaining time of the program being played, and remaining play time of the whole disc; and also the track number of the program being played. In the use of a disc where the disc name and the track name (program name) are recorded, they are also displayed. And if the recording date of the program or the disc is further included, such information is displayed as well.

The constitution of recording/playback signal circuits in the embodiment of FIG. 1 is so contrived as to be simplified by the use of an IC. In accordance with a recording operation or a playback operation, the mode of each component circuit is selectively changed by a mode switching signal obtained from the system controller 20.

In the recording mode, an audio signal is fed to an input terminal 31. The audio signal is supplied to an A-D converter 32 where the signal is sampled at a sampling frequency of 44.1 kHz and each sampled value is converted into a 16-bit digital signal through quantization.

The digital audio signal thus obtained is supplied to an audio compression encoder/decoder 33, which then compresses the audio signal approximately to ⅕. In this case, modified DCT (discrete cosine transformation) for example may be adopted as the art of audio signal compression.

The audio signal compressed in the encoder/decoder 33 is supplied via a memory controller 34 to a buffer memory 35 which is controlled by the memory controller 34, so that the signal is once stored in the buffer memory 35. For example, this buffer memory 35 consists of a DRAM having a data storage capacity of 1 Mbits. In a normal recording operation, the memory controller 34 sequentially reads out the ⅕-compressed data from the buffer memory 35 and then transfers the read data to a data encoder/decoder 36.

When a track jump of the optical pickup 3 caused by some shock or vibration is detected during the recording operation, the memory controller 34 interrupts the data transfer to the data encoder/decoder 36 and stores in the buffer memory 35 the compressed data supplied from the audio compression encoder/decoder 33. And after correction of the recording position of the proper position prior to occurrence of the track jump, the memory controller 34 resumes the data transfer from the buffer memory 35 to the data encoder/decoder 36.

Occurrence of a track jump can be detected by providing a shock detector or the like in the apparatus and deciding if the shock is so great or not as to cause a track jump. On the disc 1B employed in this embodiment, absolute address data is previously recorded in the pregroove as mentioned. Therefore a track jump can be detected also by reading out the absolute address data from the pregroove in the recording mode and judging the continuity of the absolute addresses from the decoded output. The circuits may be so modified as to detect a track jump by taking the logic sum (OR) of the output from the shock detector and the continuity of the absolute address data. It is necessary that, upon occurrence of any track jump, the power of the laser beam for magneto-optical recording be lowered or switched off.

Correction of the recording position at the occurrence of a track jump can be executed with reference to the absolute address data mentioned. As obvious from the above description, the buffer memory 35 needs to have at least a capacity sufficient for storing the compressed data which corresponds to the time required from the occurrence of any track jump to the proper correction of the recording position. In this embodiment, as mentioned, the buffer memory 35 has a storage capacity of 1 Mbits, which is so selected as to ensure an adequate margin for completely satisfying the aforementioned condition.

In this case, during a normal operation in the recording mode, the memory controller 34 executes its control action in a manner to minimize the data stored in the buffer memory 35. For example, when the amount of the data in the buffer memory 35 has exceeded a predetermined value such as 32 sectors (each of which is equivalent to 1 block (approximately 2 Kbytes) of a CD-ROM), the memory 35 is so controlled that merely such predetermined amount of the data is read out from the buffer memory 35 so as to continuously maintain an adequate write space therein for more than the predetermined amount of data.

The data encoder/decoder 36 serves to encode the compressed data transferred from the buffer memory 35 to thereby form data of a CD-ROM sector structure. Hereinafter the data of 36 sectors including the 32-sector audio data and 4 linking sectors will be referred to as a cluster. As will be described later, each of recording and playback operations is performed per cluster.

The output of the data encoder/decoder 36 is supplied to an EFM & CIRC encoder/decoder 37 which executes a coding process for error detection and correction and also a process of adaptively modulating the data for recording, e.g., EFM (eight-fourteen modulation) in this embodiment. The error detection and correction code is obtained by changing the interleave format of the CIRC (cross interleave Reed-Solomon code) adopted for the CD (compact disc). The recording data are intermittent, and a total of four sectors for linking the adjacent clusters (hereinafter referred to as linking sectors) are added before and after the 32-sector audio data, whereby the recording data is formed of a unitary cluster which is composed of 36 sectors.

Figure 2:
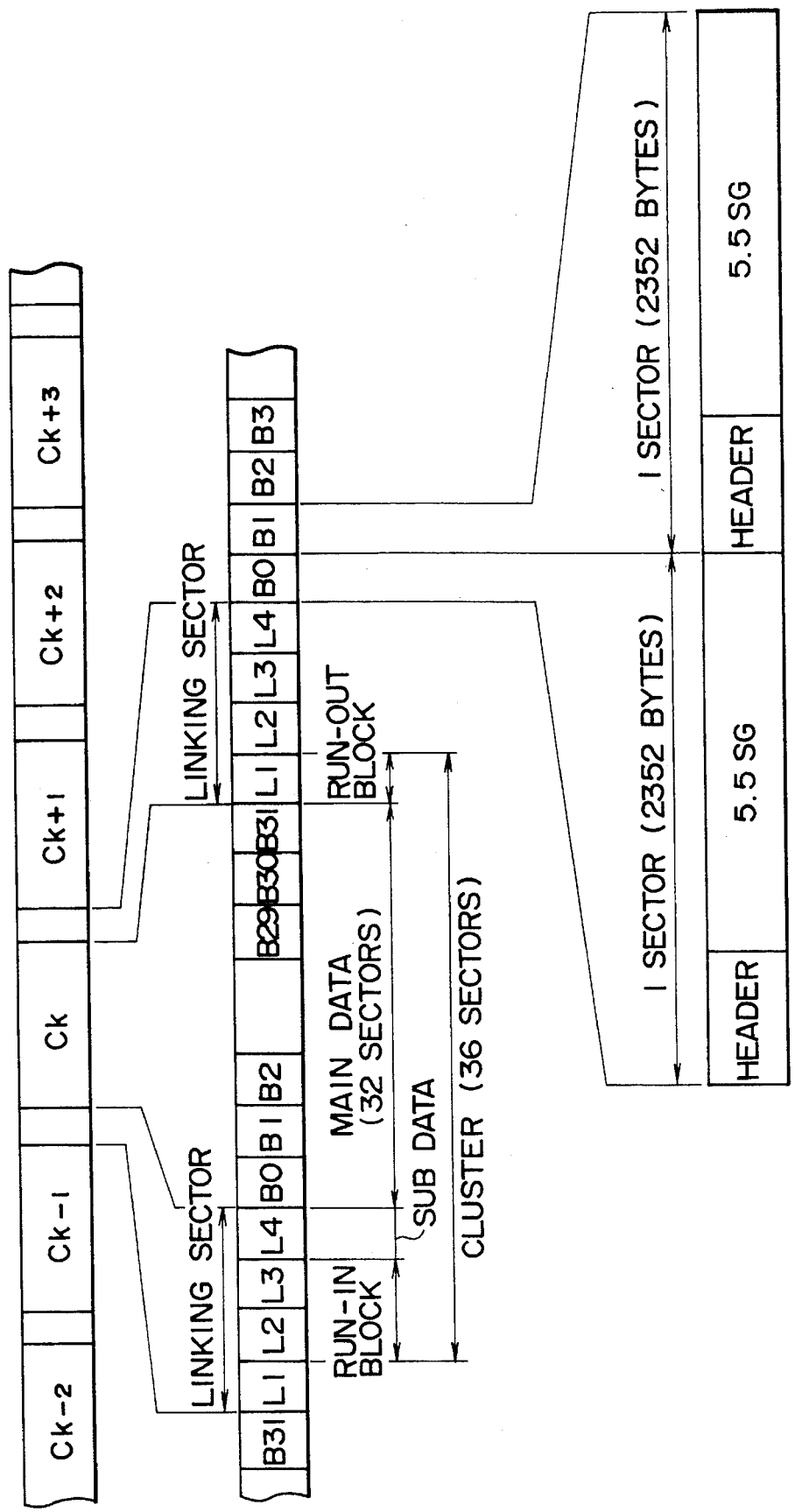
FIG. 2 is a schematic diagram for explaining data recorded on and reproduced from a disc in the apparatus of FIG. 1.

FIG. 2 is a schematic diagram for explaining the encoded record data, wherein Ck, Ck+1, Ck+2, . . . respectively denote the encoded data (main data) of the kth, (k+1)th, (k+2)th, . . . clusters. More specifically, the record data are so arranged that 4 linking sectors L1–L4 are inserted between the adjacent main data each composed of 32 sectors B0–B31. In recording the kth cluster for example as shown in FIG. 2, 3 linking sectors are added before the 32 sectors B0–B31 of the main data Ck and also 1 linking sector is added after the data Ck to thereby form a cluster of 36 sectors, and such cluster is recorded as one unit of the data.

The linking sectors added before the main data Ck consist of 2 sectors L2, L3 for a run-in block and 1 sector L4 for sub data. The sub-data sector L4 is an area usable for display of a still picture or the like. And the sector L1 added after the main data Ck of one cluster is used for a run-out block. Thus the record data of unitary 36 sectors are dealt with intermittently. The 4 linking sectors are used also for attaining proper synchronism with the rise of a magnetic field of the magnetic head 3 at the start of an intermittent recording operation or with control of the laser power.

As shown in FIG. 2, 1 sector is composed of 2352 bytes, and its beginning serves as a 16-byte header. Each sector includes 5.5 unitary data termed a sound group (SG) which is composed of 424 bytes, and 2 sectors constitute 11 sound groups. The compressed audio data is decodable per sound group, and a 2-channel stereo audio signal can be reproduced properly due to the existence of 11 sound groups included in the 2 sectors.

The record data thus formed is supplied via a head driver 38 to the recording magnetic head 3, so that magnetic field modulated by the record data is applied to the disc 1B (magneto-optical disc). Meanwhile a laser beam emitted from the optical pickup 4 is irradiated to the disc 1B. In the recording mode, a laser beam of a fixed power greater than that used in the playback mode is irradiated onto the record track. And the data is recorded on the disc 1B thermomagnetically by a combination of the irradiated laser beam and the modulated magnetic field from the magnetic head 3. The magnetic head 3 and the optical pickup 4 are so arranged as to be movable synchronously with each other in the radial direction of the disc 1B.

In the recording mode, the output of the optical pickup 4 is supplied via an RF amplifier 39 to an address decoder 40, which then extracts and decodes the absolute address data recorded in the pregroove formed along the track on the disc 1B. Subsequently the detected absolute address data is supplied to the EFM & CIRC encoder/decoder 37 to be thereby inserted in the record data and then is recorded on the disc 1B. The absolute address data is supplied also to the system controller 20 so as to be used for recognition and control of the recording position.

The output signal of the RF amplifier 39 is supplied to the servo controller 5 where a control signal for servo-controlling the linear velocity of the spindle motor 2 at a fixed value is produced on the basis of the signal obtained from the pregroove on the disc 1B, so that the rotation of the spindle motor 2 is maintained constant.

Now the playback operation will be described below. In the playback mode, the spindle motor 2 is controlled by the servo controller 5, as in the aforementioned recording mode, in accordance with the signal from the pregroove in such a manner as to rotate the disc 1B at a constant linear velocity which is equal to that in the recording mode.

In the playback mode, the optical pickup 4 senses the reflected light of the laser beam irradiated onto a target track, thereby detecting the focus error by astigmatism means or the like, the tracking error by push-pull means or the like, and further detecting the polarization angle (Kerr rotation angle) of the reflected light from the target track. Consequently the optical pickup 4 generates a reproduced RF signal as an output.

The output of the optical pickup 4 is supplied to the RF signal processor 31, which then extracts the focus error signal and the tracking error signal from the output of the optical pickup 4 and supplies the extracted signals to the servo controller 5 while converting the reproduced signals into binary signals and supplying the same to the EFM & CIRC encoder/decoder 37.

The servo controller 5 executes focus control of the optical mechanism for the optical pickup 4 in a manner to decrease the focus error signal to zero and also executes tracking control of the optical mechanism for the optical pickup 4 in a manner to decrease the tracking error signal to zero.

The output of the RF amplifier 39 is supplied to an address decoder 40, which then extracts and decodes the absolute address data recorded in the pregroove. Subsequently the absolute address data outputted from the address decoder 40 is supplied via the EFM & CIRC encoder/decoder 37 to the system controller 20 so as to be used by the servo controller 5 for position control of the optical pickup 4 in the radial direction of the disc. For controlling the position on the record track being scanned by the optical pickup 4, the system controller 20 is capable of utilizing also the address data of unitary sectors extracted from the reproduced data.

In the playback mode, as will be described later, the compressed data read from the disc 1B is written in the buffer memory 35 and then is read out therefrom to be expanded approximately 5 times. However, due to the difference between the two data transmission rates, the operation of reading the data from the disc 1B by the optical pickup 4 is performed intermittently so that none of overflow is caused in the buffer memory 35 and also that the data stored therein is not decreased below a predetermined amount.

The EFM & CIRC encoder/decoder 37 demodulates the EFM signal supplied thereto via the RF amplifier 39 and executes error correction. The output of the EFM & CIRC encoder/decoder 37 is supplied to the sector-structure data encoder/decoder 36 which decodes the CD-ROM sector structure to thereby regain the data in the former compressed state.

The output of the data encoder/decoder 36 is once stored in the buffer memory 35 via the memory controller 34. In a normal playback operation, the memory controller 34 first writes the compressed output data of the data encoder/decoder 36 in the buffer memory 35, then reads out the data therefrom constantly at a lower transfer speed approximately $1/5$ times the write speed, and transfers the read data to the audio compression encoder/decoder 33. In this case, the memory controller 34 controls the write/read action relative to the buffer memory 35 in a manner that the writing is interrupted prior to overflow of the buffer memory 35 and also that the data stored in the buffer memory 35 is maintained over the predetermined amount.

When any track jump is detected in the playback mode, the memory controller 34 interrupts the action of writing the data from the data encoder/decoder 36 into the buffer memory 35 and merely transfers the data to the audio compression encoder/decoder 33. And after correction of the playback position, the memory controller 34 resumes the action of writing the data from the data encoder/decoder 36 into the buffer memory 35.

Also as described, during a normal operation in the playback mode, the memory controller 34 executes its control action in a manner that a predetermined amount of data greater than the aforementioned minimum necessity is stored in the buffer memory 35. For example, the control action is so executed that when the data in the buffer memory 35 has been decreased below a predetermined amount, the data from the disc 1B is intermittently taken in by the optical pickup 4, and the data obtained from the data encoder/decoder 36 is written in the buffer memory 35 so as to maintain a state where more than the predetermined amount of the data is always stored therein.

The time required for fully writing the data in the buffer memory 35 while reading out the data therefrom is approximately 0.9 second, and the stored data after expansion corresponds to the audio data of 3 seconds or so. More specifically, even if the signal is rendered nonreadable from the disc 1B in a state where the data is fully stored in the buffer memory, it is still possible to keep outputting the playback signal for a time of 3 seconds or so. Therefore a sound skip trouble can be prevented by accessing the optical pickup to the former position during such period of time and reading the signal properly from the disc 1B again.

The data decompressed in the audio compression encoder/decoder 33 is supplied to a D-A converter 41 so as to be converted into the original analog signal. And the analog signal thus obtained is delivered from an output terminal 42.

A TOC (table of contents) is recorded in the innermost portion of the disc 1B. The TOC includes start and end addresses of individual programs recorded on the disc, track names (program names), disc name and so forth.

On a disc of additionally recordable type, a UTOC (user TOC) is also provided for supervising the recorded audio signals. The UTOC is composed of a sector 0, a sector 1 and a sector 2.

FIG. 3 shows the structure of the sector 0 included in the UTOC. In the sector 0, there is written the recording status of the disc 1B. A pointer on the sector 0, where the start address of an $\underline{n}$th program is recorded, is written in P-TNO$\underline{n}$ (where n=1, 2, . . . , 255). More specifically, if "m" (=1, 2, . . . ) is recorded in P-TNO$\underline{n}$, the start address and the end address of the $\underline{n}$th program are written in the sector 0 from (76+m×2)×4 bytes onward.

FIG. 4 shows the structure of the sector 1 included in the UTOC. In the sector 1, data of a disc name and track names are recorded in the form of ASCII. In P-TNA$\underline{n}$ (where n=1, 2, . . . , 255), there is written the first address on the sector 1 where the track name of the $\underline{n}$th program is recorded. If P-TNA1 is "m" for example, the track name of the 1st program is recorded in the sector 1 from (76+m×2)×4 bytes onward. The data in P-TNA2 and those subsequent thereto are also recorded in the same manner. The disc name is recorded in the sector 1 from 76×4 bytes onward.

FIG. 5 shows the structure of the sector 2 included in the UTOC. This sector is used to records the recording date and time. In a recording apparatus having this function, both the date and the time are automatically recorded simultaneously with an ordinary recording operation. In P-TRD$\underline{n}$, there is written the first address in the sector 2 where the recording date and time of the $\underline{n}$th program are written. If P-TRD1 is "m" for example, the recording date and time of the 1st program are written in the sector 2 from (76+m×2)×4 bytes onward. The data in P-TRD2 and those subsequent thereto are also recorded in the same manner. The recording date and time of the disc are recorded from 76×4 bytes in the sector 2.

The data relative to the individual tracks in the sectors 0 and 1 of the UTOC include Link-P. When the data of one program composed of unitary clusters is recorded at non-continuous positions on the disc, Link-P in the sector 0 indicate the recording position to which the data of that program is linked next on the disc. Meanwhile in the sector 1, Link-P indicates the recording position to which the program of that name is linked next on the disc.

The TOC and UTOC are read out from the disc immediately after the disc is loaded in the apparatus, and then are stored in a portion of the buffer memory 35. Manipulation for changing the UTOC is performed at the time of recording, editing or inputting the disc name or the program name. If this manipulation is performed, first the UTOC information stored in a portion of the buffer memory 35 is updated. And when an eject key or a secondary power key (not a main power switch provided separately) is actuated, the new UTOC information is recorded in the UTOC area of the disc 1B.

Hereinafter a description will be given on the method for fast playback in the cue and review modes.

In this example where the decodable minimum unitary data is a sound group, a fast forward or reverse playback operation is performed in the cue or review mode per unitary block consisting of $\underline{n}$ sound groups (where $\underline{n}$=1, 2, 3, . . . ). The cue or review mode is carried out by extracting the data of such unitary block from the informationally continuous data on the disc at an interval of $\underline{m}$ unitary blocks (where $\underline{m}$=1, 2, 3, . . . ).

An example of fastforward playback is shown in FIG. 6A. This example represents a case where a fast playback operation is performed in the cue mode to reproduce audio data recorded sequentially and continuously from the innermost of the disc to the outermost thereof. The temporally continuous data can be reproduced in the cue mode without reference to the UTOC by sequentially scanning the tracks outward from the inner portion of the disc. The playback speed in this case is (m+1) times higher than the normal speed.

In the example of FIG. 6A, n=11 and m=4. Accordingly, there is repeated a 5-fold fast playback operation of extracting data of 2 sectors from the disc while skipping 8 sectors which correspond to four of a 2-sector unitary block equal to data of 11 sound groups.

Due to 2 sectors as described above, a stereo signal can be reproduced properly without any error relative to left and right channels. Since an audio signal of 2 sectors corresponds to 0.127 second in this example, it follows that an audio signal of every unitary 0.127 second can be reproduced at a 5-fold high speed.

In the cue mode, the timing to extract the data from the disc 1B is controlled exactly as in the aforementioned normal playback operation where the buffer memory 35 is so controlled by the memory controller 34 that none of overflow is caused in the buffer memory 35 and also that the data stored therein is not decreased below the predetermined amount. And the audio data of unitary blocks extracted from the disc 1B are sequentially written in the buffer memory 35 without any joint. Thereafter the data is constantly read out from the buffer memory 35 under the aforementioned control by the memory controller 34 and then is expanded and decoded, so that the intermittent sound is reproduced continuously. The pitch of the reproduced sound in this case is the same as that in the normal playback mode.

FIG. 6B shows an example of fast playback in the review mode to reproduce audio data recorded sequentially and continuously on the disc outward from the inner track. In this case also, n=11 and m=4 to perform a 5-fold speed review playback operation. In this review mode, as shown in FIG. 6B, the data skipping direction is reverse to that in the cue mode, but the playback direction of the data of unitary blocks is the same as the normal playback direction.

In the example of FIG. 6B also, the informationally continuous data can be reproduced in the review mode without reference to the UTOC by sequentially scanning the tracks outward from the inner portion of the disc.

The above example represents a case where the data is recorded continuously from the inner portion of the disc toward the outer portion thereof. Now a description will be given on another exemplary case where data of one program is recorded at noncontinuous positions on the disc by using the aforementioned Link-P. In the following example, the recording position of the informationally continuous data on the disc is recognized by using the UTOC mentioned.

Figure 7A:
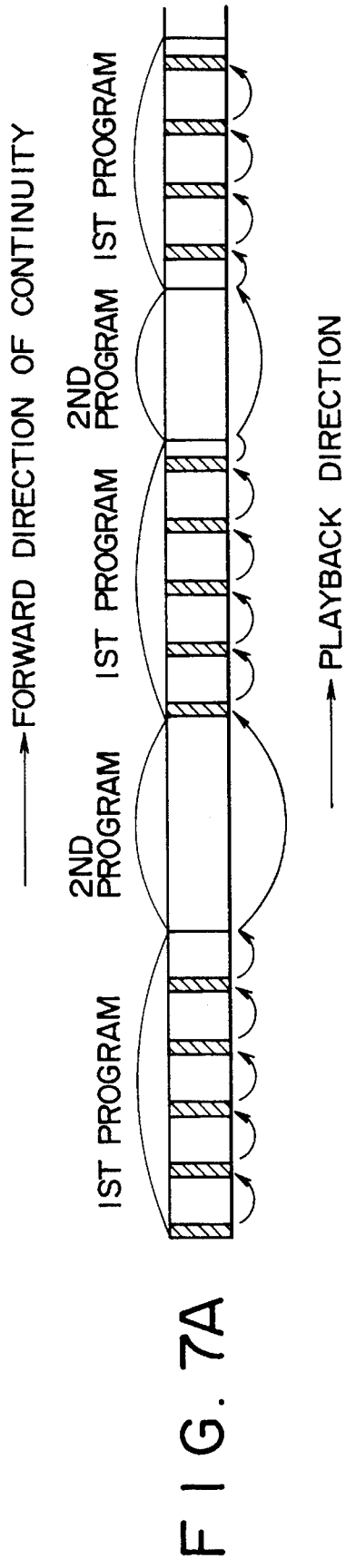
FIGS. 7A and 7B are schematic diagrams for explaining another example of the disc playback method of the invention.

FIG. 7A shows an example of such fast playback in the cue mode. In this example, the data of a 1st program is recorded at physically noncontinuous positions in such a manner as to alternate with the data of a 2nd program. In the cue mode, first the physically noncontinuous data of the 1st program is rendered informationally continuous by using the UTOC, and the aforementioned fast playback of such data is performed. Subsequently the data of the 2nd program is processed in the same manner as the above, and thereafter the data of a 3rd program and so forth are reproduced in the cue mode. If n=11 and m=4 in this example also, a fast playback operation can be performed in the cue mode at a 5-fold high speed.

Figure 7B:
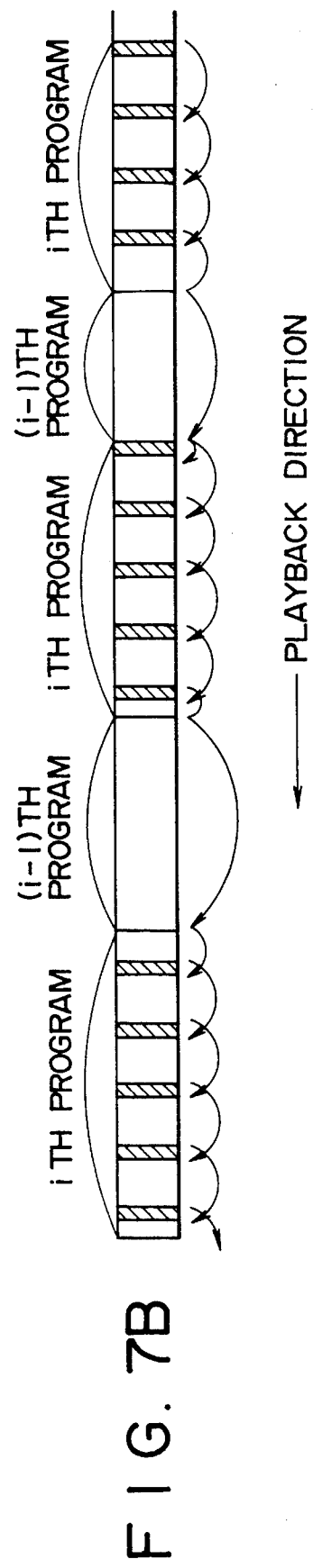

FIG. 7B shows an example of fast playback in the review mode with Link-P. The playback state in this mode is exactly the same as that in the foregoing example of FIG. 6B, and the data of ith, (i–1)th, (i–2)th, (i–3)th, 2nd and 1st programs are reproduced sequentially in the review mode by using the UTOC.

Figure 8:
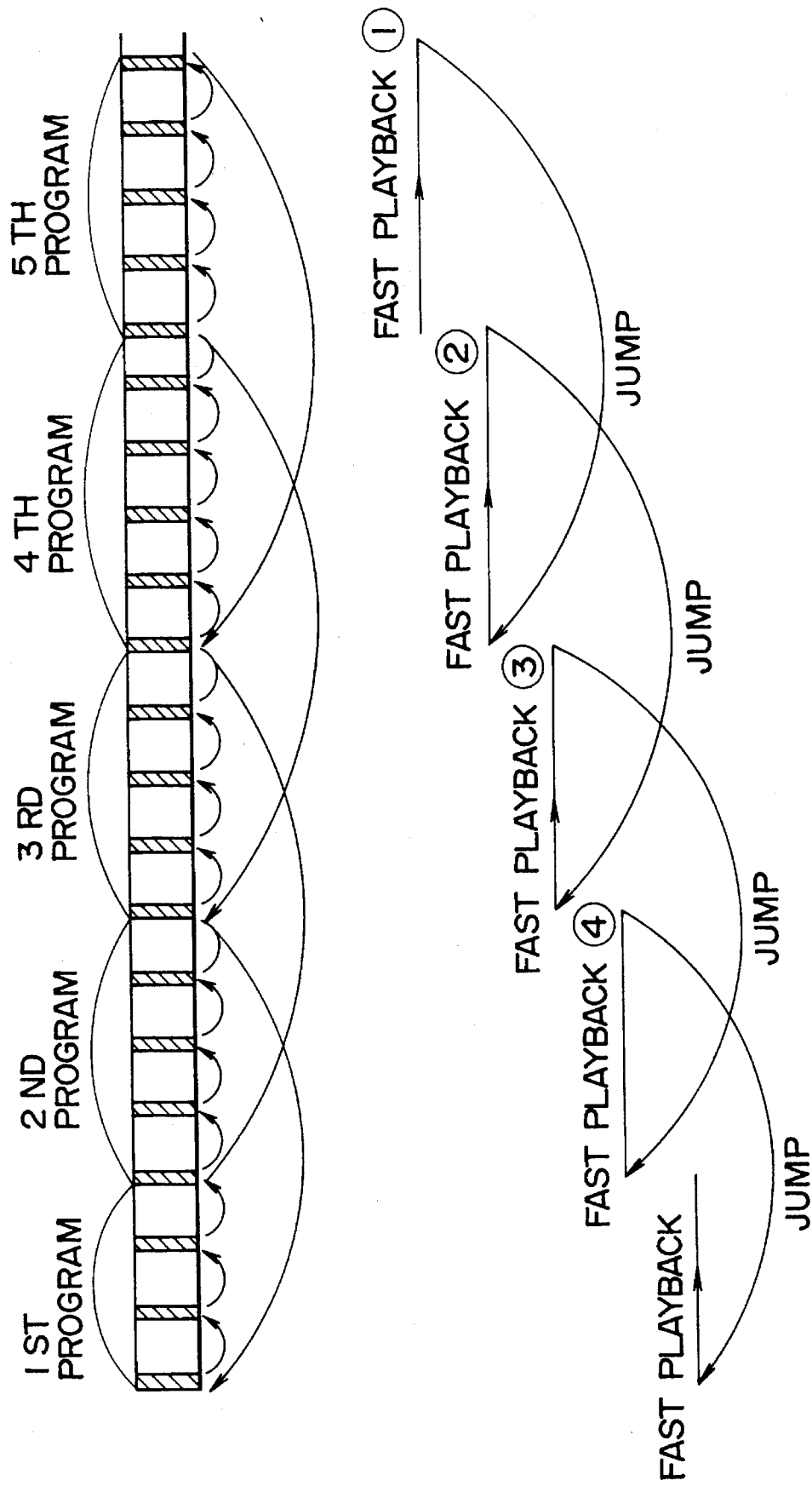
FIG. 8 is a schematic diagram for explaining a further example of the disc playback method of the invention.

FIG. 8 shows an example of hybrid playback which is a combination of fast playback operations in cue and review modes. In this example, review playback is performed program by program, but cue playback is performed within each program. More specifically, first the aforementioned cue playback is performed from the beginning of the 5th program and, after completion of the 5th program, the playback jumps from the last data position of the 5th program to the beginning of the 4th program, and the cue playback of the 4th program is performed. And upon completion of the 4th program, the playback jumps from the last data position of the 4th program to the beginning of the 3rd program, and the cue playback of the 3rd program is performed. Thereafter the above playback operation is advanced similarly for the next and subsequent programs.

In the example of FIG. 8 also, the UTOC information is used as in the foregoing example of FIG. 7. Although the audio data are recorded sequentially in the example of FIG. 8, a hybrid playback operation can be performed in combined cue and review modes properly as in the example of FIG. 7 even if the data of one program is recorded with Link-P at noncontinuous positions.

In the above example, the sound reproduced in the combined cue and review modes is continuous without any interruption. However, a no-sound gap may be formed at an adequate time interval or between adjacent programs. It is also possible to insert a message or the like in place of such no-sound gap.

What is claimed is:

1. A method for fast playback in cue/review modes of a disc to reproduce therefrom compressed audio data read burstly in a predetermined amount as a unit, said method comprising the steps of:

predetermining a unitary block of data which consists of $n$ times (where $n$ is a positive integer) the decodable minimum unitary amount of the compressed data;

sequentially extracting, out of the informationally continuous data on said disc, the data of said unitary block at an interval of $m$ unitary blocks (where $m$ is a positive integer greater than 1) in the forward direction of the continuity of the data; and producing audio signals from the extracted data.

2. A method for fast playback in cue/review modes of a disc to reproduce therefrom compressed audio data read burstly in a predetermined amount as a unit, said disc also having information relative to the recording positions of the data and information relative to the continuity of the recorded data, said method comprising the steps of:

predetermining a unitary block of data which consists of $n$ times (where $n$ is a positive integer) the decodable minimum unitary amount of the compressed data;

sequentially extracting, out of the continuous data based on said information relative to the recording positions and also based on said information relative to the continuity of the data on said disc, the data of said unitary block at an interval of $m$ unitary blocks (where $m$ is a positive integer greater than 1) in the forward direction of the continuity of the data; and producing audio signals from the extracted data.

3. A method for fast playback in cue/review modes of a disc to reproduce therefrom compressed audio data read burstly in a predetermined amount as a unit, said method comprising the steps of:

predetermining a unitary block of data which consists of $n$ times (where $n$ is a positive integer) the decodable minimum unitary amount of the compressed data;

sequentially extracting, out of the informationally continuous data on said disc, the data of said unitary block at an interval of $m$ unitary blocks (where $m$ is a positive integer greater than 1) in the reverse direction of the continuity of the data; and producing audio signals from the extracted data.

4. A method for fast playback in cue/review modes of a disc to reproduce therefrom compressed audio data read burstly in a predetermined amount as a unit, said disc also having information relative to the recording positions of the data and information relative to the continuity of the recorded data, said method comprising the steps of:

predetermining a unitary block of data which consists of $n$ times (where $n$ is a positive integer) the decodable minimum unitary amount of the compressed data;

sequentially extracting, out of the continuous data based on said information relative to the recording positions and also based on said information relative to the continuity of the data on said disc, the data of said unitary block at an interval of $m$ unitary blocks (where $m$ is a positive integer greater than 1) in the reverse direction of the continuity of the data; and producing audio signals from the extracted data.

5. A method for fast playback in cue/review modes of a disc to reproduce therefrom a plurality of programs which are composed of compressed audio data read burstly in a predetermined amount as a unit, said method comprising the steps of:

predetermining a unitary block of data which consists of $n$ times (where $n$ is a positive integer) the decodable minimum unitary amount of the compressed data;

sequentially extracting, out of the informationally continuous data on said disc, the data of said unitary block of one program at an interval of $m$ unitary blocks (where $m$ is a positive integer greater than 1) in the forward direction of the continuity of the data;

producing audio signals from the extracted data and thereafter accessing the beginning of the program temporally anterior to the reproduced program; and repeating such playback operation to reproduce the plurality of programs sequentially.

6. A method for fast playback as recited in claim 1 wherein in the extraction step, said data is extracted faster than the corresponding audio signals are produced in the producing step.

7. A method for fast playback in cue/review modes of a disc to reproduce compressed audio data recorded in a predetermined group of sectors as a unit, each of said units forming informationally continuous data on said disc, said data being decodable per a minimum unitary amount of compressed data, and said disc having information relative to the continuity of the recorded data, said method comprising the steps of:

predetermining a number of sectors for data extraction therefrom as a unitary block, said unitary block consisting of $\underline{n}$ times, where $\underline{n}$ is a positive integer, of said decodable minimum unitary amount of compressed data;

sequentially extracting, out of said informationally continuous data on said disc, the data of said unitary blocks at intervals of $\underline{m}$ unitary blocks, where $\underline{m}$ is a positive integer greater than 1, by skipping $\underline{m}$ unitary blocks for each unitary block having data extracted therefrom, said interval $\underline{m}$ being constant throughout said sequentially extraction step; and producing audio signals from the extracted data.

8. The method of claim 7 wherein said extraction step is in a forward direction of the continuity of the data.

9. The method of claim 7 wherein said extraction step is in the reverse direction of the continuity of the data.

10. The method of claim 7, wherein said extraction step is based on said information relative to the continuity of the data on said disc.

11. A method for fast playback in cue/review modes of a disc to reproduce therefrom compressed audio data recorded in a predetermined group of sectors as a unit, each of said units forming informationally continuous data on said disc, said data being decodable per a minimum unitary amount of compressed data, said data forming a plurality of audio programs, and said disc having information relative to the continuity of the recorded data, said method comprising the steps of:

predetermining a number of sectors for data extraction therefrom as a unitary block, said unitary block consisting of $\underline{n}$ times, where $\underline{n}$ is a positive integer, of said decodable minimum unitary amount of compressed data;

sequentially extracting, out of said informationally continuous data on said disc and also based on said information relative to the continuity of the data on said disc, the data of said unitary blocks of one program at intervals of $\underline{m}$ unitary blocks, where $\underline{m}$ is a positive integer greater than 1, by skipping $\underline{m}$ unitary blocks for each unitary block having data extracted therefrom, said interval $\underline{m}$ being constant throughout said sequentially extraction step;

producing audio signals from the extracted data and thereafter accessing the beginning of any program temporally anterior to the reproduced program; and repeating such playback operation to reproduce the plurality of programs sequentially.

12. The method of claim 11 wherein said extraction step is in a forward direction of the continuity of the data.

13. The method of claim 11 wherein said extraction step is in the reverse direction of the continuity of the data.

14. A method for fast playback as recited in claim 7 wherein in the extraction step, said data is extracted faster than the corresponding audio signals are produced in the producing step.

15. A method for fast playback in cue/review modes of a disc to reproduce compressed audio data recorded in a predetermined group of sectors as a unit, each of said units forming informationally continuous data on said disc, said data being decodable per a minimum unitary amount of compressed data, said data forming a plurality of audio programs wherein at least one of said programs recorded in non-continuous units, and said disc having information relative to the continuity of the recorded data, said method comprising the steps of:

predetermining a number of sectors for data extraction therefrom as a unitary block, said unitary block consisting of $\underline{n}$ times, where $\underline{n}$ is a positive integer, of said decodable minimum unitary amount of compressed data;

sequentially extracting, out of said informationally continuous data on said disc, the data of said unitary blocks at intervals of $\underline{m}$ unitary blocks, where $\underline{m}$ is a positive integer greater than 1, by skipping $\underline{m}$ unitary blocks for each unitary block having data extracted therefrom, said interval $\underline{m}$ being held constant throughout said sequentially extraction step; and producing audio signals from the extracted data.

16. The method of claim 15 wherein said extraction step is in a forward direction of the continuity of the data.

17. The method of claim 15 wherein said extraction step is in the reverse direction of the continuity of the data.

18. The method of claim 15, wherein said extraction step is based on said information relative to the continuity of the data on said disc.

19. A method for fast playback in cue/review modes of a disc to reproduce therefrom compressed audio data recorded in a predetermined group of sectors as a unit, each of said units forming informationally continuous data on said disc, said data being decodable per a minimum unitary amount of compressed data, said data forming a plurality of audio programs wherein at least one of said programs recorded in non-continuous units, and said disc having information relative to the continuity of the recorded data, said method comprising the steps of:

predetermining a number of sectors for data extraction therefrom as a unitary block, said unitary block consisting of $\underline{n}$ times, where $\underline{n}$ is a positive integer, of said decodable minimum unitary amount of compressed data;

sequentially extracting, out of said informationally continuous data on said disc and also based on said information relative to the continuity of the data on said disc, the data of said unitary blocks of one program at intervals of $\underline{m}$ unitary blocks, where $\underline{m}$ is a positive integer greater than 1, by skipping $\underline{m}$ unitary blocks for each unitary block having data extracted therefrom;

producing audio signals from the extracted data and thereafter accessing the beginning of any program temporally anterior to the reproduced program; and repeating such playback operation to reproduce the plurality of programs sequentially.

20. The method of claim 19 wherein said extraction step is in a forward direction of the continuity of the data.

21. The method of claim 19 wherein said extraction step is in the reverse direction of the continuity of the data.

22. A method for fast playback as recited in claim 15 wherein in the extraction step, said data is extracted faster than the corresponding audio signals are produced in the producing step.

* * * * *